United States Patent [19]

Läuger et al.

[11] 4,016,713
[45] Apr. 12, 1977

[54] DRIVE FOR HIGH-SPEED AXLES OR SHAFTS OF SPINDLES

[75] Inventors: Alfred Läuger, Immenstaad; Jochen Schrade, Markdorf, both of Germany

[73] Assignee: Dornier System GmbH, Germany

[22] Filed: July 2, 1975

[21] Appl. No.: 592,399

[30] Foreign Application Priority Data

Aug. 23, 1974 Germany .......................... 2440455

[52] U.S. Cl. ................................ 57/100; 57/58.89
[51] Int. Cl.² ........................ D01H 1/12; F16C 19/30
[58] Field of Search ................ 57/34 R, 58.89, 100

[56] References Cited
UNITED STATES PATENTS

| | | | |
|---|---|---|---|
| 3,126,697 | 3/1964 | Cizek et al. ...................... | 57/48.89 |
| 3,704,579 | 12/1972 | Tooka ............................... | 57/100 X |
| 3,739,565 | 6/1973 | Nagel ............................... | 57/58.89 |
| 3,747,998 | 7/1973 | Klein et al. ..................... | 57/58.89 X |
| 3,877,212 | 4/1975 | Carzler ............................ | 57/58.89 X |

*Primary Examiner*—Donald E. Watkins
*Attorney, Agent, or Firm*—James E. Bryan

[57] ABSTRACT

This invention relates to an improvement in a drive for a high-speed axle or shaft or a spindle in which a spinning can having a radially-extending wall is mounted at one end of a rotatable shaft, said can being positioned opposite a parallel housing wall with a gap between them, and in which the other end of said shaft is mounted in said housing in a spiral groove cap-type bearing, the improvement comprising direct-current drive motor means with electronic commutation, the stator ring with segment winding of said motor means being mounted in said wall of said housing, permanent magnet means in said radially-extending wall of said spinning can, said magnet means being magnetized in the direction of the longitudinal shaft axis, and disc means connecting said magnets and being capable of transmitting the magnetic field pressure flow, whereby the magnetic field is closed.

2 Claims, 4 Drawing Figures

DRIVE FOR HIGH-SPEED AXLES OR SHAFTS OF SPINDLES

The present invention relates to a drive for high-speed axles or shafts of spindles, in which a spinning can or bucket having a radially-extending wall is mounted at one end of the shaft, which spinning can or bucket is positioned opposite a parallelly-extending housing wall with a gap between them, and in which the other end of the shaft is positioned in the housing by means of a spiral groove cap-type bearing.

It is known in the art to position spinning turbines for the open-end spinning process in a twin-disc support by means of ball bearings and to drive the same by means of a flat belt. It is disadvantageous that this kind of support, in addition to requiring a high structural expenditure and having a high energy consumption, produces a great deal of noise during operation. Due to the belt drive, soiling in the spinning turbines readily occurs since the turbines cannot be installed in closed housings. Disadvantageous are further, the uneven speed of the individual spinning turbines which is caused by a variable belt slippage, as well as a drifting of the rpm produced by the centrally-positioned asynchronous motor with which the belt is driven.

For the purpose of eliminating these disadvantages, it is the object of the present invention to provide a single drive for the high-speed axles or shafts of spinning turbines which drive operates with little noise even at speeds of over 100,000 rpm, and renders possible a long service life of the spinning turbines.

This object is obtained, in accordance with the present invention, — in a spinning turbine of the type described hereinabove — by virtue of the fact that the drive motor is a direct-current motor wth electronic commutation whose stator ring, provided with segment windings, is mounted in the housing wall, and by virtue of the fact that separate permanent magnets are arranged in the radially-extending wall of the spinning can or bucket acting as a rotor, opposite the stator ring with the air gap between. The permanent magnets are magnetized in the direction of the shaft axis, and mounted with a steel disc connecting the permanent rings for the magnetic field pressure flow so that the magnetic field is closed via the permanent magnet, the air gap, the stator ring core, the air gap, and the steel disc. Surprisingly, the inventive drive assures that the shaft with the end thereof facing away from the spinning can is pressed into the spiral groove cap-type bearing so that this bearing, being effective only in one direction, can fully execute its intended operation at all times.

While it is known to press the shaft ends of open-end spinning turbines, being rounded-off or provided with a sphere, into a spiral groove cap-type bearing (Deutsche Offenlegungsschrift No. 2,206,237), specifically provided magnets at the shaft end are necessary therefor which must be present independently of the drive.

According to an advantageous embodiment of the present invention, the position of the permanent magnets of the rotor to the segment winding is detectable or determinable by means of sensors. The commutation of the direct-current motor is rendered possible thereby.

According to the present invention it is further advantageous that the sensors are luminous diodes and phototransistors which are in operative connection with two light pipes mounted offset by 90°, and that the ends of the light pipes are situated opposite a wall part of the rotor which is blackened in an area of 180°.

Further advantages, features, and possibilities of application of the present invention will become apparent from the following description of the accompanying drawings, wherein FIG. 1 is a cross-sectional view of the support and of the drive of an inventive spinning turbine;

Figure 1:
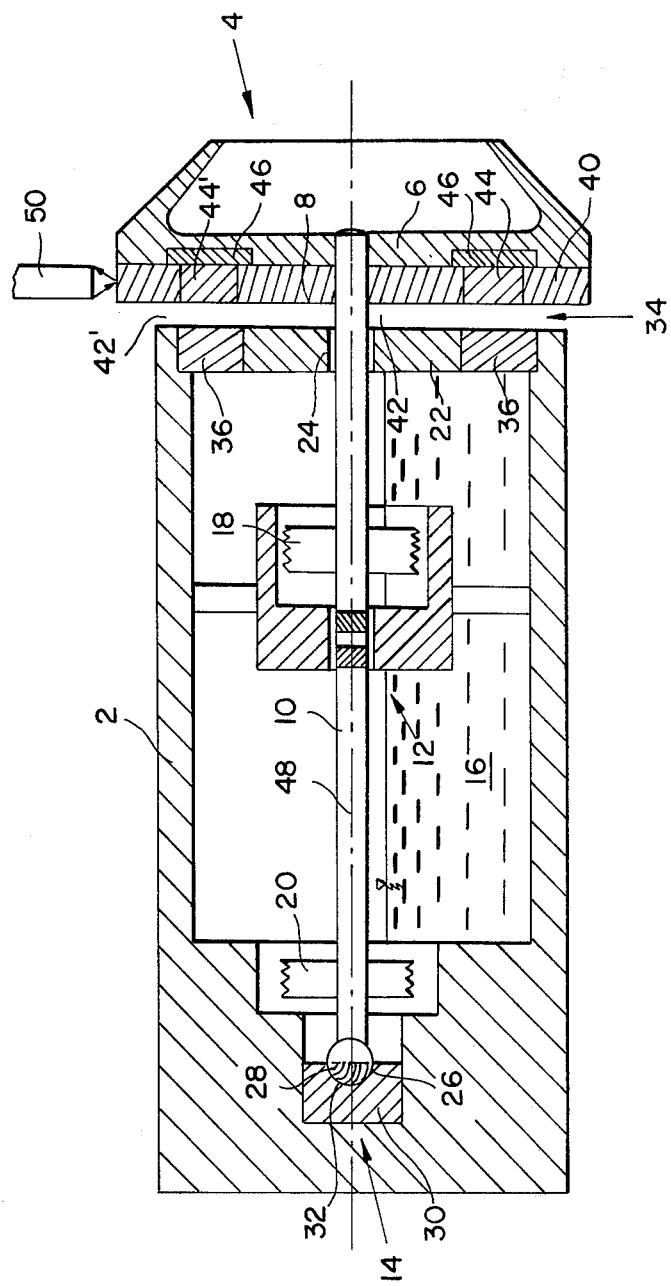

FIG. 1 illustrates a spinning turbine 4 for open-end spinning positioned within a housing 2. The spinning turbine 4 is composed of a spinning can or bucket 6 with a radially-extending wall 8 and an axle 10 which is mounted in a radial bearing 12 and an axial radial bearing 14. For the purpose of supplying the bearings 12 and 14 with lubricant, an oil supply 16 is present within the housing 2 which oil supply is fed by means of threaded pumps 18 and 20 to the bearings 12 and 14.

The axle 10 extends through a housing wall 22. A visco-packing or gasket 24 is provided for purposes of sealing.

In the area of the radial bearing 12, the axle 10 is provided with herringbone grooves which allow for a higher specific bearing pressure of the bearing. Accordingly, the frictional output is reduced, compared to a conventional friction bearing.

The axial radial bearing 14 is a spherical spiral groove bearing which, during axial stresses, also can absorb radial stresses or loads. The axle 10 is connected with a sphere 26 which, on the surface thereof, has the spiral grooves 28. The structural part 30 includes a spherical segment 32.

The oil supply of both bearings 12 and 14 takes place forcibly by means of the threaded pumps 18 and 20. The oil supply 16 is employed for this purpose and is brought to the bearing points by means of the threaded pumps 18 and 20. When the axle 10 is not rotating, the level of the oil supply 16 is below the lower edge of the axle 10.

In high-speed shafts, a sliding packing or gasket cannot be employed. It is for this reason that, according to the illustrated embodiment of the present invention, a visco-packing is employed. When the shaft is not rotating, the level of the oil supply 16 must be below the visco-packing 24.

The drive motor 34 has a permanent magnet rotor since, at very high speeds (for example, 100,000 rpm) the use of an exciting winding on the rotor is not possible. Motors with permanent magnet rotors are known in the art as synchronous motors and direct-current motors with electronic commutation. Synchronous motors, however, have stability problems not only at high speeds, but also during rated service. The direct-current motor with electronic commutation employed in accordance with the present invention does not have this disadvantage.

Figure 2:
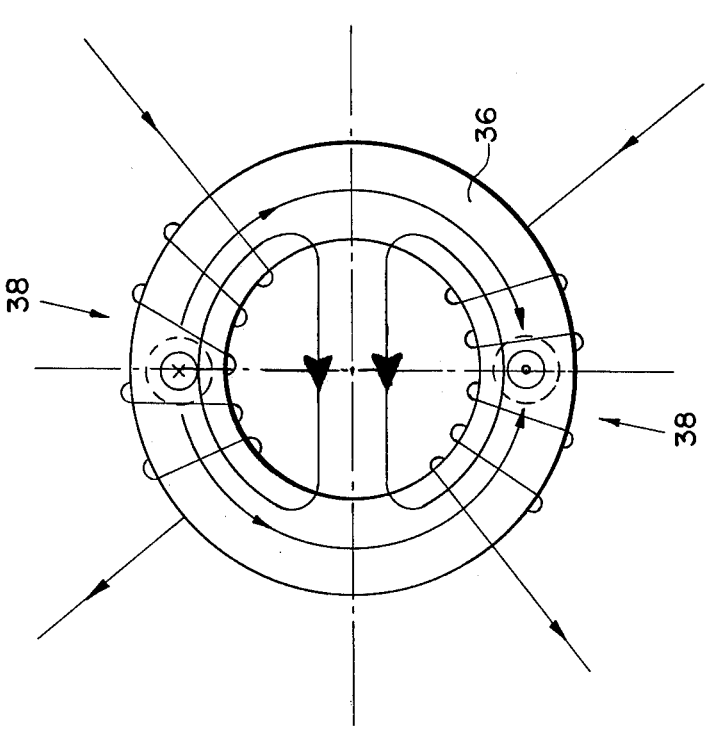
FIG. 2 is a top plan view of the stator of the drive with the magnetic flux being shown therein.
Figure 4:
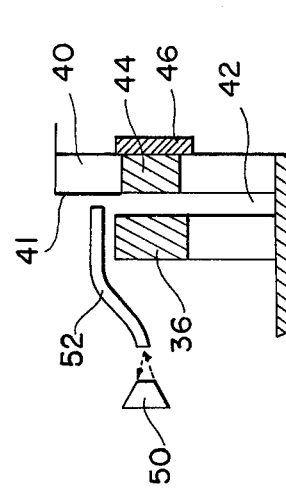
FIG. 4 illustrates the arrangement of sensing means for the electronic commutation of the drive motor.

The drive motor 34 is composed of a stator ring 36 in the housing wall 22, with segment windings 38, which are clearly visible in FIG. 2.

The wall of the spinning can or bucket 8 is also the rotor 40. Between the stator ring 36 and the rotor 40 is an air gap 42. The rotor 40 is composed of individual permanent magnets 44 which are interconnected by means of a disc 46. The disc 46 takes care of the magnetic field pressure flow. The permanent magnets 44 are magnetized in the direction of the spinning turbine axis 48. They constantly produce a torque which is oriented in the direction toward the spherical segment 32. The motor force being present at all times thus ensures that the spherical spiral groove bearing 14 is fully operative at all times.

Figure 3:
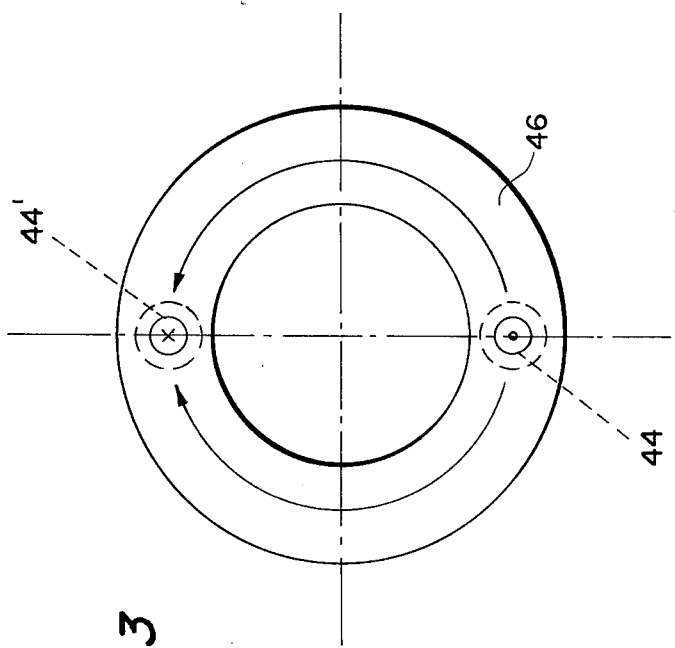
FIG. 3 is a top plan view of the magnetic flux in a short-circuit ring.

As is apparent from FIG. 1, the magnetic field of the rotor 40 is closed via the permanent magnet 44, the air gap 42, the stator ring 36, the air gap 42', the permanent magnet 44', and the short-circuit disc 46. The latter is apparent also from FIG. 3.

The permanent magnets 44 and the short-circuit disc 46 are integrated, in an advantageous manner, in the spinning can or bucket 6 so that a separate motor rotor may be eliminated.

The construction of the stator ring winding and the electronics for the commutation of the winding current are known to the art.

The position of the permanent magnets 44 to the segment winding of the stator ring must be detected in the direct-current motor with electronic commutation. This may be accomplished, for example, with sensors which are responsive to the rotating permanent magnetic field. The magnetic field-dependent sensors are also influenced, however, by the stator field and render the evaluation difficult.

The rotor position scanning may be rendered possible also by means of the optical sensors 50. In this case, the sensors 50 are mounted, for example, on the jacket of the spinning can or bucket 6 (FIG. 1).

According to the present invention it is also possible to blacken the wall of the rotor 40 within the area 41. In this case, the sensors 50 operate by way of a light pipe 52 and are mounted away from the stator winding 36. Advantageously two sensors 50 offset by 90° are employed. The rotor 40 is blackened for example over an area of 180°.

It will be obvious to those skilled in the art that many modifications may be made within the scope of the present invention without departing from the spirit thereof, and the invention includes all such modifications.

What is claimed is:

1. In a drive for a high-speed axle or shaft of a spindle including a spinning can having a radially-extending wall mounted at one end of a rotatable shaft, a parallel housing wall positioned opposite said can with a gap between them, and a spiral groove cap-type bearing in said housing and in which the other end of said shaft is mounted, the improvement comprising direct-current drive motor means with electronic commutation, said motor having a stator ring with segment winding mounted in said wall of said housing, permanent magnet means in said radially-extending wall of said spinning can, said magnet means being magnetized in the direction of the longitudinal shaft axis, and disc means connecting said magnets, whereby the magnetic field is closed and the magnetic field pressure flow may be transmitted.

2. A drive according to claim 1 including sensor means for scanning the position of said spinning can, and light-conducting pipe means mounted adjacent a blackened area of said can and adapted to actuate said sensor means.

* * * * *